United States Patent [19]

Mueller et al.

[11] Patent Number: 5,322,392
[45] Date of Patent: Jun. 21, 1994

[54] PROCESS FOR ROCK CONSOLIDATION AND/OR CAVITY FILLING E.G. IN TUNNEL CONSTRUCTION AND MINING

[75] Inventors: Heinz Mueller, Monheim; Claus-Peter Herold, Mettmann; Stephan von Tapavicza, Erkrath; Helmut Edel, Filderstadt, all of Fed. Rep. of Germany

[73] Assignees: Henkel Kommanditgesellschaft auf Aktien; E. Epple & Co. GmbH, Fed. Rep. of Germany

[21] Appl. No.: 853,755

[22] PCT Filed: Nov. 26, 1990

[86] PCT No.: PCT/EP90/02026
§ 371 Date: Jul. 29, 1992
§ 102(e) Date: Jul. 29, 1992

[87] PCT Pub. No.: WO91/08271
PCT Pub. Date: Jun. 13, 1991

[30] Foreign Application Priority Data

Dec. 4, 1989 [DE] Fed. Rep. of Germany ........ 3940088

[51] Int. Cl.$^5$ .............................................. E02D 3/12
[52] U.S. Cl. ................................ 405/264; 405/150.1; 523/132
[58] Field of Search ............... 405/132, 150.1, 150.2, 405/263, 264; 166/295; 523/130, 131, 132

[56] References Cited

U.S. PATENT DOCUMENTS 4,114,382  9/1978  Kubens et al. .................... 405/264
4,743,288  5/1988  Hirsbrunner .................... 405/264 X
4,811,787  3/1989  Navratil et al. ................. 405/264 X
5,199,823  4/1993  Mueller et al. .................... 405/264

FOREIGN PATENT DOCUMENTS 1153698  9/1963  Fed. Rep. of Germany.
1792316  8/1968  Fed. Rep. of Germany.
3907989  9/1990  Fed. Rep. of Germany.

OTHER PUBLICATIONS

H. Barthel, Improvement of Rock Mass Strength by Chemical Injections, Bergb.-Wiss. 17, vol. 18, pp. 281-285.

Primary Examiner—David H. Corbin
Attorney, Agent, or Firm—Ernest G. Szoke; Wayne C. Jaeschke; Real J. Grandmaison

[57] ABSTRACT

A process is described for rock consolidation, e.g. in tunnel construction and mining, by injection of aqueous preparations of melamine resin condensates and/or urea formaldehyde condensates together with an acid curing agent. The process is characterized by the use of aqueous solutions of hydrogen sulfate salts, especially solutions of alkali and/or ammonium bisulfates, as curing agents. The curing agent solutions can contain additional auxiliary agents and active substances such as corrosion inhibitors, structurizers and adhesion agents. Preferred resin solutions for consolidation with these aqueous curing agents contain added zeolite NaA and/or hydrosodalite for increasing their serviceability, and especially for prolonging their storage life.

17 Claims, No Drawings

PROCESS FOR ROCK CONSOLIDATION AND/OR CAVITY FILLING E.G. IN TUNNEL CONSTRUCTION AND MINING

BACKGROUND OF THE INVENTION

1. Field of the Invention

The invention relates to a further improvement in the application of aqueous synthetic resin systems based on melamine resins and/or urea formaldehyde resins for rock consolidation or as cavity filling-agents.

2. Discussion of Related Art

The improvement of rock mass strength by injection of auxiliary chemicals, usually prepared in water, has been described many times in the literature: compare for example DE-AS 11 53 698 as well as the publication H. Barthel "Improvement of rock mass strength by chemical injections", Bergb.-Wiss. 17 (1970), Volume 8, 281 to 285.

The subject of the prior application P 39 07 989.9 of the applicant is an improvement of this technology. The subject of the teaching of this prior protective right is aqueous preparations of acid-curable melamine resins and/or urea formaldehyde condensates for application in rock consolidation and/or cavity filling, e.g. in tunnel construction and mining, the improvement lying in the provision of an addition of zeolite NaA and/or hydrosodalite to increase the serviceability of the acid-curable aqueous resin preparations, and especially to prolong their stability in storage. The aqueous resin preparations contain in particular about 0.1 to 20 weight % and preferably about 0.5 suspended zeolite NaA or of the hydrosodalite. The co-utilization of urea, preferably in amounts of about 10 to 40 weight %, relative to the active substance content of the aqueous resin solution, can be provided for. The active substance content of curable melamine resins and/or urea formaldehyde condensates is usefully in the range of about 50 to 80 weight %, preferably in the range of about 55 to 75 weight %, relative in each case to the aqueous solution.

In the process, also claimed in the prior application, for rock consolidation, e.g. in tunnel construction and mining, the aqueous preparations of the melamine resins and/or urea formaldehyde condensates are mixed with an acid curing agent and then injected into the rock to be consolidated. Preferably aqueous solutions of mineral acids and especially an aqueous solution of phosphorous acid are used as the acid curing agent. It can be useful first to mix the mineral acids into aqueous electrolyte salt solutions, and then to intimately mix the curing agent solution with the resin solutions described at the outset and to inject them into the place of their application.

The aim of the present invention is the further development of the technical teaching of the named prior application of the applicant. The invention intends in particular to remove ecological doubts which can arise when aqueous solutions of phosphorous acids are used as curing agents. As is known, the undesirable increase in eutrophication of waters is attributed to water-soluble salts of acids of phosphorus. The entry of corresponding phosphorus compounds into rock can be at least undesirable if there is a risk of the leaching out of such water-soluble phosphorus compounds from the rock and the entry of the leached-out salt into surface waters.

The aim of the invention in the narrower sense is thus the selection of an acid-reacting curing agent for the stabilized resin systems of the prior application, with regard to which waters, do not exist.

DESCRIPTION OF THE INVENTION

Other than in the operating examples, or where otherwise indicated, all numbers expressing quantities of ingredients or reaction conditions used herein are to be understood as modified in all instances by the term "about".

The technical solution of the teaching according to the invention starts out from the discovery that aqueous solutions of water-soluble hydrogen sulfate salts are particularly suitable for bringing about the desired curing of the aqueous resin preparations based on melamine resins and/or urea formaldehyde resins. By adjustment of the concentration of the dissolved hydrogen sulfate, the curing time is selectively influenced. In doing this, it is possible to bring about an almost spontaneous curing of the resin preparations.

The subject of the invention is accordingly a process for rock consolidation and/or cavity filling, e.g. in tunnel construction and mining, by injection of aqueous preparations of melamine resin condensates and/or urea formaldehyde condensates together with an acid curing agent, the process being characterized by the use of aqueous solutions of hydrogen sulfate salts as curing agents. Suitable hydrogen sulfate salts, or bisulfate salts, are in particular the corresponding metal and/or ammonium bisulfates. Particular importance can attach to sodium bisulfate ($NaHSO_4$).

As described in the named prior patent application P 39 07 989, the aqueous preparations of the acid-curable resins on the one hand and the aqueous curing agent solutions on the other are prepared separately from each other and then mixed together practically immediately before application. As already indicated, direct influence can be exerted on the curing time of the resin system through the choice of the concentration of the bisulfate salt in the aqueous curing agent solution. According to the invention, operation with approximately 5 to 35 weight % aqueous sodium bisulfate solutions is preferred, special importance attaching to the concentration range up to about 30 weight % and in particular the range from about 15 to 25% bisulfate.

The aqueous resin preparations proposed for curing correspond to the particulars in the named prior patent application P 39 07 989. Their active substance content of curable melamine resins and/or urea formaldehyde condensates is preferably about 50 to 80 weight %, especially about 55 to 75 weight % -relative in each case to the aqueous resin solution. For stabilization, they usefully contain suspended zeolite NaA or hydrosodalite, in amounts of about 0.1 to 20 weight %, preferably in amounts of about 0.5 to 15 weight % - relative in each case to the active substance content of the aqueous resin preparation. It can be provided in addition to add urea to these aqueous resin solutions, amounts of the dissolved urea in the range of about 10 to 40 weight %, relative to the active substance content of the aqueous resin solution, being preferred. The aqueous resin solutions of the kind described are then mixed according to the invention with the bisulfate salt solutions, for which mixing ratios in the range of about 1:1 can here be preferred, and injected in the intimately mixed state into the rock. According to the invention, the co-utilization of additives in the aqueous hydrogen sulfate salt solution can also be useful. Those considered here in particular are water-soluble corrosion inhibitors, acid-resistant thickening agents and/or adhesion promotors.

Water-soluble corrosion inhibitors are often described in the published prior art and are commercially available. They are usually added in small amounts, which are for example below 1 weight % and preferably below 0.5 weight % - relative in each case to the aqueous bisulfate curing agent solution. Suitable for example are organic components with basic character, such as alkylpyridine compounds, which are used in combination with other active substances, for example dialkylene thiourea and small amounts of surfactant.

It has proved useful furthermore to mix into the acid curing agent solution a very finely dispersed structurizing solid component, which, however, should have only a limited thickening effect. In particular, very finely dispersed inorganic powders based on silicic acid or silicic acid compounds have proved suitable here. In particular, appropriately finely dispersed mixtures of quartz and kaolinite are suitable. The additives of this kind preferred according to the invention are largely grit-free and have practically no particles larger than 200 micrometers. Water-insoluble powders of this kind can be added in considerable amounts, for example in amounts of about 10 to 30 weight %, preferably in amounts of about 15 to 25 weight % - relative in each case to the aqueous curing agent composition -without a too strong and therefore undesirable thickening effect occurring. A certain structurizing effect, which can be observed during the working in, is thoroughly desirable. Nevertheless the nature of the aqueous curing agent solution, even after addition of 20 weight %, for example, of such a structurizer, is still water-like. The viscosity values are usually not or not substantially above 100 mPas. The co-utilization of small amounts of swellable layer silicates, for example those of the montmorillonite type, can be desirable for the stabilization of these inorganic structurizers.

A third class of suitable auxiliary agents for the aqueous curing agent solutions proposed in accordance with the invention are acid-resistant adhesion agents. Suitable here in particular are aqueous emulsion polymers or emulsion copolymers, for example aqueous dispersions of butadiene/styrene copolymers. Adhesion agents of this kind are usually added in amounts below 10 weight %, for example in the range of about 3 to 7 weight % - again relative each time to the aqueous curing agent, component.

Within the scope of the teaching according to the invention, it can also be useful in a particular embodiment to co-utilize appropriate adhesion agents, and especially acid-resistant adhesion agents, in the aqueous resin component also. The nature and amount of this mode of application of adhesion agents corresponds to the particulars according to the invention for their use in the aqueous curing agent component.

EXAMPLE

An aqueous feed material containing 60 weight % melamine resin is mixed each time in parallel tests with an aqueous curing agent solution based on the following formulation (figures in weight % relative to aqueous curing agent solution):

8, 15 or 25 NaHSO$_4$, 0.2 water-soluble corrosion inhibitor (commercial product DEHYCOR A 31), 5.6 adhesion agent based on a 55 weight % aqueous plasticizer-free vinyl acetate/ethylene copolymer dispersion, 20.0 very finely dispersed inorganic thickener based on quartz/kaolinite (commercial product Sillikolloid), 0.6 montmorillonite-based swellable layer silicate, the remainder water.

The curing time of each of these different mixtures of materials is determined at room temperature in separate batches. The curing time is determined as the time after which the system can no longer be stirred with the spatula in the manual test. The following table lists the curing times determined in these comparative tests:

| Conditons: | 60% resin solution; resin: curing agent system = 1:1 | | |
|---|---|---|---|
| | 8% NaHSO$_4$ | 15% NaHSO$_4$ | 25% NaHSO$_4$ |
| Curing time at room temperature | 55 minutes | 5 minutes | less than 1 minute |

In comparative tests, the test is carried out once with addition of adhesion agent in accordance with the formulation previously indicated, and then for comparison a blank value is determined without co-utilization of adhesion agent in the aqueous curing agent. The adhesion to moist Eternit is determined as follows:

Blank value without addition of adhesion agent, is about 1 N/mm$^2$ Addition of adhesion agent, 2 to 4 N/mm$^2$.

We claim:

1. The process of stabilizing rock or filling cavities in tunnel construction and mining, comprising injecting into said rock or cavities an aqueous composition comprising an acid-curable resin selected from the group consisting of melamine, urea-formaldehyde, and mixtures thereof, a viscosity stabilizer for said resin selected from the group consisting of zeolite NaA, hydroxysodalite, and mixtures thereof, and an aqueous solution of an acid curing agent for said resin, said curing agent consisting essentially of a hydrogen sulfate salt.

2. A process as in claim 1 wherein said hydrogen sulfate salt is selected from the group consisting of an alkali metal bisulfate and ammonium bisulfate.

3. A process as in claim 1 wherein said viscosity stabilizer is present in the amount of from about 0.1 to about 20% by weight, based on the weight of the active substance content of said aqueous composition.

4. A process as in claim 1 wherein said hydrogen sulfate salt is present in the amount of from about 5 to about 35% by weight, based on the weight of said aqueous solution of acid curing agent.

5. A process as in claim 1 wherein said aqueous composition contains a water-soluble corrosion inhibitor, a thickening agent, or an adhesion agent.

6. A process as in claim 1 wherein said aqueous solution of said acid curing agent is mixed with said aqueous composition of acid-curable resin just prior to injecting said aqueous composition into said rock or said cavities.

7. A process as in claim 1 wherein said resin is present in an amount of from about 50 to about 80 percent by weight, based on the weight of said aqueous composition.

8. A process as in claim 1 wherein said aqueous composition contains from about 10 to about 40 percent by weight of urea, based on the active substance content of said composition.

9. A process as in claim 1 wherein said aqueous composition and said aqueous solution of said acid curing agent are mixed in a ratio of about 1:1.

10. An aqueous composition for stabilizing rock or filling cavities in tunnel construction and mining, said composition comprising an acid-curable resin selected from the group consisting of melamine, urea-formaldehyde, and mixtures thereof, a viscosity stabilizer for said resin selected from the group consisting of zeolite NaA, hydroxysodalite, and mixtures thereof, and an aqueous solution of an acid curing agent for said resin, said curing agent consisting essentially of a hydrogen sulfate salt.

11. A composition as in claim 10 wherein said hydrogen sulfate salt is selected from the group consisting of an alkali metal bisulfate and ammonium bisulfate.

12. A composition as in claim 10 wherein said viscosity stabilizer is present in the amount of from about 0.1 to about 20% by weight, based on the weight of the active substance content of said aqueous composition.

13. A composition as in claim 10 wherein said hydrogen sulfate salt is present in the amount of from about 5 to about 35% by weight, based on the weight of said aqueous solution of acid curing agent.

14. A composition as in claim 10 wherein said aqueous composition contains a water-soluble corrosion inhibitor, a thickening agent, or an adhesion agent.

15. A composition as in claim 10 wherein said resin is present in an amount of from about 50 to about 80 percent by weight, based on the weight of said aqueous composition.

16. A composition as in claim 10 wherein said aqueous composition contains from about 10 to about 40 percent by weight or urea, based on the active substance content of 17. A composition as in claim 10 wherein said aqueous composition and said aqueous solution of said acid curing agent are present in a ratio of about 1:1.

* * * * *

UNITED STATES PATENT AND TRADEMARK OFFICE
CERTIFICATE OF CORRECTION

PATENT NO. : 5,322,392
DATED : June 21, 1994
INVENTOR(S) : Mueller et al.

It is certified that error appears in the above-indentified patent and that said Letters Patent is hereby corrected as shown below:

Column 2, line 2, after "which,"
insert --the doubts described here, of undesirable eutrophication of--.

In claim 16, at column 6, line 15, after "of" insert --said composition--.

Signed and Sealed this

Tenth Day of January, 1995

Attest:

BRUCE LEHMAN

Attesting Officer

Commissioner of Patents and Trademarks